W. R. BURNS.
Corn Sheller.
No. 53,567.
Patented April 3, 1866.
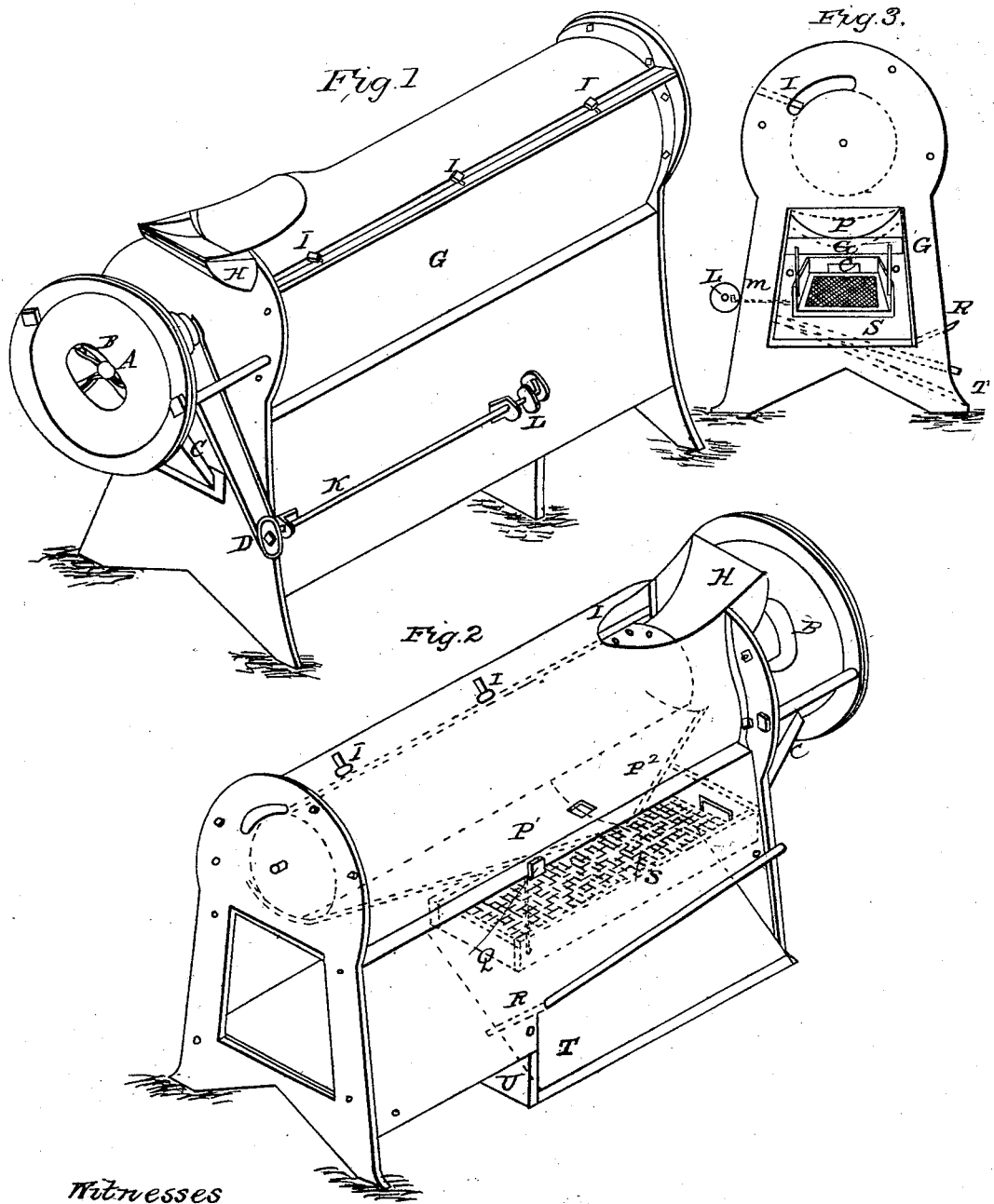

UNITED STATES PATENT OFFICE.

WILLIAM R. BURNS, OF LANCASTER, PENNSYLVANIA.

IMPROVEMENT IN CORN-SHELLERS.

Specification forming part of Letters Patent No. 53,567, dated April 3, 1866.

*To all whom it may concern:*

Be it known that I, WILLIAM R. BURNS, of the city and county of Lancaster, in the State of Pennsylvania, have invented new and Improved Combinations on Cylindrical Corn Shellers and Cleaners; and I do hereby declare that the following is a full and exact description thereof, reference being had to the accompanying drawings, and to the letters of reference marked thereon, in which—

Figure 1 is a perspective view of the front and one side of the machine, and Fig. 2 a perspective descriptive view of its rear and other side, with the interior arrangement shown in outline. Fig. 3 is a rear view, showing the interior in part.

To enable others skilled in the art of making and using my invention, I will more fully describe its construction and operation.

I construct my corn sheller and cleaner on the general plan used for such machines, having spiked or toothed cylinders G revolving within a cast or sheet iron case or top, with a hopper-like opening, H, on its top, where the corn is fed in, differing, however, in having a continuous sheller-bar along its entire length, made adjustable by means of slots I I I and binding screws and nuts along the upper side edge, as shown.

Beneath the spiked cylinder G there is a concave bottom, P' P², inclined from both ends, (shown in Fig. 2,) with an aperture, V, over the center of the screen or sieve S, beneath it, onto which the corn and cobs fall. The rear of this sieve is suspended at the sides o from a cross-piece, Q, within the machine, and is made to vibrate by means of a link, m, Fig. 3, attached to the eccentric or crank L through an opening, (shown in Fig. 1,) and receives its motion through the shaft K and pulley D, connected by a strap or cord with the pulley E around or on the main shaft of the cylinder. There is also a strap-pulley, F, by which the power is imparted to the said shaft, which also operates a powerful fan within the case B. The blast is conveyed directly on and over the screen S by the flue C opening at c into the chamber. Thus a blast is produced which sweeps over the sieve or screen and space beneath the concave bottom P' P², effectually blowing all the impurities out at the same time that the cobs are shaken off from the rear of the sieve and discharged at the rear opening with the lighter particles of cobs and fibers, allowing the shelled corn, thoroughly cleaned, to escape through the sieve and over the inclined plane T to be discharged.

R represents a sliding board fitting in grooves, by which the discharge-aperture can be regulated over T and the edge of R.

The pulley D, Fig. 1, may be replaced with a larger or smaller one, and the eccentric L provided with a series of holes, in order to increase or lessen the speed and stroke of the shaking attachment to the sieve.

The adjustability of the shelling-bar is not only advantageous in the case of wear, but also adapts it for large ears of corn or smaller, as happens in various seasons or localities.

I am aware that self-adjusting bars or means are employed on other classes of corn-shellers, and that the spiked cylinders and upper casing are common. I am also aware that fans for cleaning the corn have been used, together with revolving screens and other devices; nor do I claim any of the parts used, independently considered.

What I claim, and desire to secure by Letters Patent, is—

The combination of the adjustable shelling-bar, with its slots I I I, and the concave double-inclined bottom P' P², with its opening V under the spiked cylinder G, together with the vibrating sieve S, shaking attachment L, m, K, and D, fan B, and flue C, when these several parts are arranged and operated substantially in the manner described, for the purpose specified.

WM. R. BURNS.

Witnesses:
WM. B. WILEY,
JACOB STAUFFER.